2,145,293

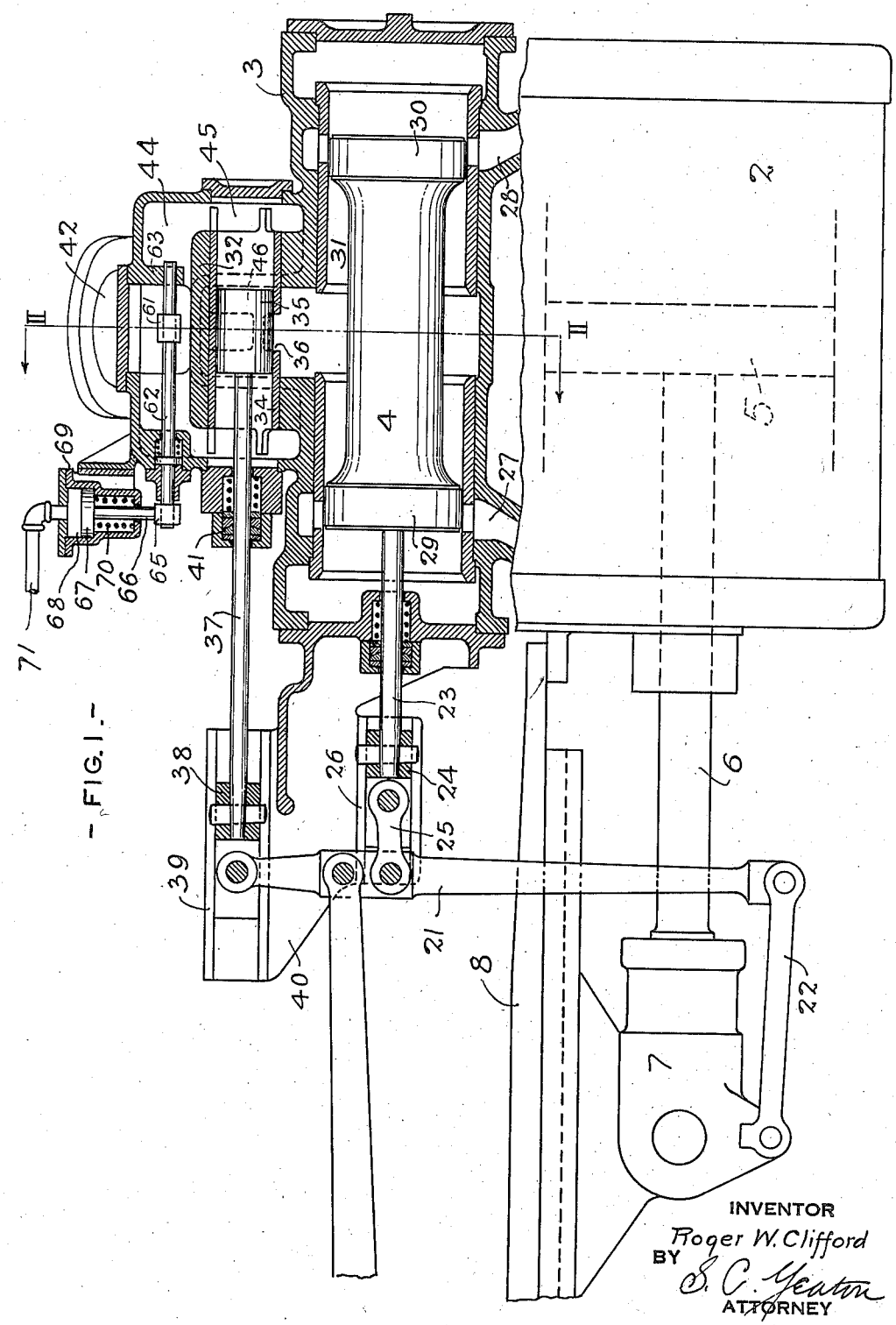
Jan. 31, 1939.  R. W. CLIFFORD  2,145,293
STEAM ENGINE VALVE
Filed Jan. 12, 1937   3 Sheets-Sheet 1
INVENTOR
Roger W. Clifford
BY
ATTORNEY Jan. 31, 1939.　　　R. W. CLIFFORD　　　2,145,293
STEAM ENGINE VALVE
Filed Jan. 12, 1937　　　3 Sheets-Sheet 2
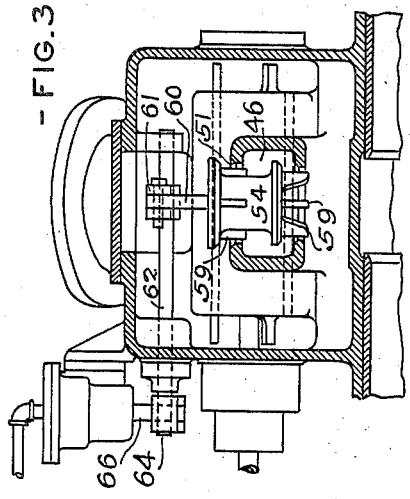
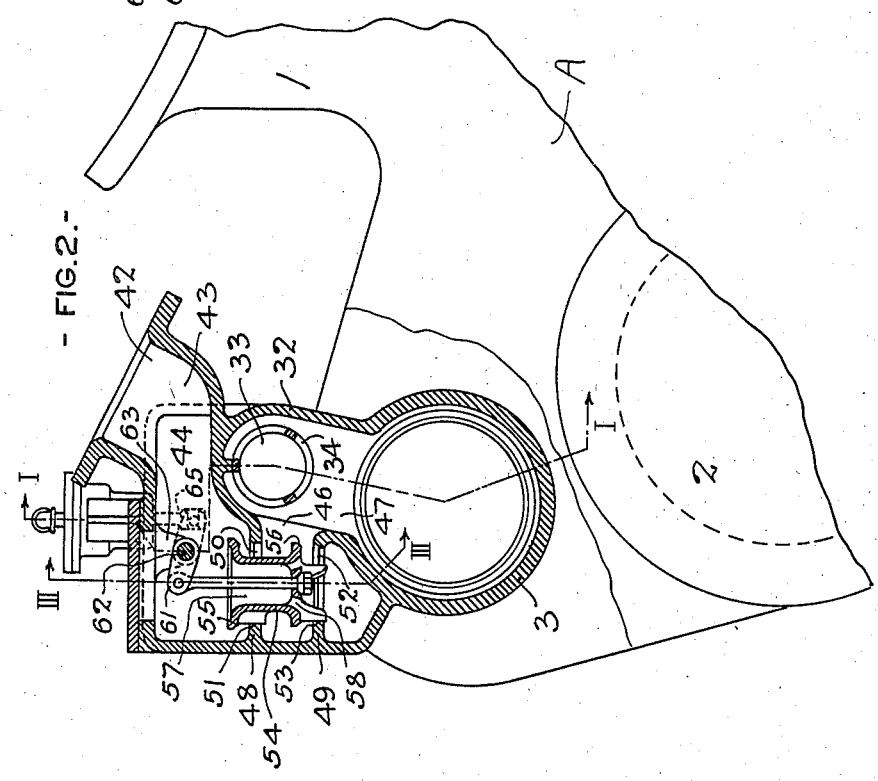
INVENTOR
Roger W. Clifford
BY
S. C. Yeaton
ATTORNEY Jan. 31, 1939.   R. W. CLIFFORD   2,145,293
STEAM ENGINE VALVE
Filed Jan. 12, 1937   3 Sheets-Sheet 3
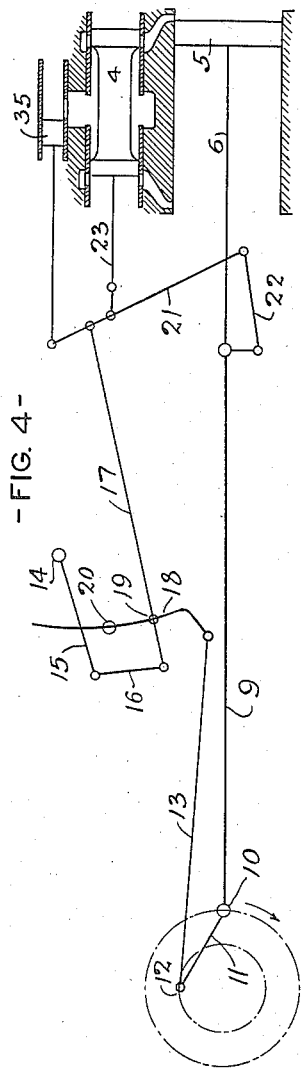
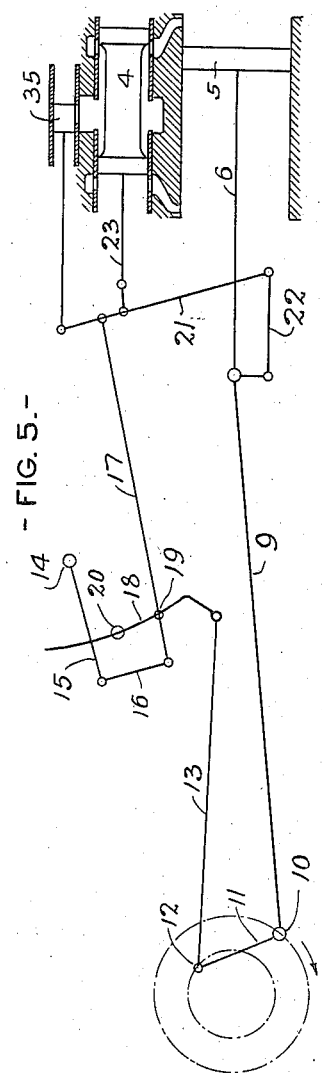
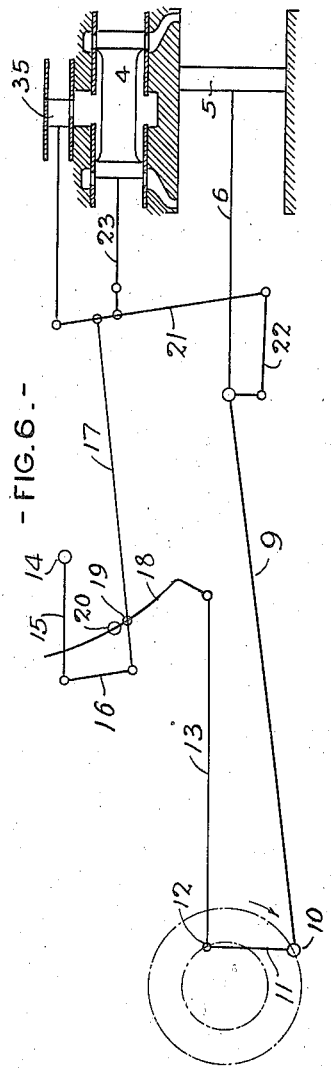
INVENTOR
Roger W. Clifford
BY
ATTORNEY Patented Jan. 31, 1939

UNITED STATES PATENT OFFICE 2,145,293

STEAM ENGINE VALVE

Roger W. Clifford, Schenectady, N. Y., assignor to American Locomotive Company, New York, N. Y., a corporation of New York Application January 12, 1937, Serial No. 120,148

5 Claims. (Cl. 121—142)

This invention relates to valves and a valve gear mechanism for controlling the steam events to a power cylinder, and has for its principal purpose the use of an auxiliary cut-off valve for controlling the cut-off of steam to the cylinder under certain conditions, the main valve being employed to control the cut-off of steam to the cylinder under other conditions.

More specifically, this invention relates to an improvement in steam distribution for a power cylinder whereby the main valve is made to control the distribution of steam during starting periods and while operating under loads requiring all but short cut-offs, and the auxiliary valve is made to control the cut-off of steam at ranges below the range obtainable by the use of the ordinary main valve, the valve gear being so devised that the shortening of the cut-off by the auxiliary valve results in better distribution, undesirable features of former constructions being done away with by the novel construction and operation of the valve gear.

An object of the invention is to provide means for shortening the cut-off of steam to the cylinder by the use of an auxiliary cut-off valve operated by a valve gear mechanism in such a way that shortening of the cut-off results in an increasing steam port opening into the cylinder and a delaying of the points of release, closure and admission by the main valve.

A further object is the provision made for shortening of the cut-off by adjustment of the valve gear mechanism in such a manner as to prevent a distortion of the valve gear mechanism from causing an unintentional reversal of the engine.

A further object is to provide steam supply means and valve control means therefor for a power cylinder whereby the valve controlling means can be used over a range of cut-offs enough to include operation on long, hard pulls at moderate speed at long cut-offs and also for high speed operation at short cut-offs.

A further object is to provide means for shortening the cut-off by the auxiliary valve whereby a relatively long adjustment of the link block will be required to effect a small change in the cut-off, thereby enabling fine adjustments of the cut-off to be made.

Other and further objects of and advantages achieved by the present invention will be apparent from the following description of an approved embodiment thereof and the claims appended hereto.

The invention is illustrated in the accompanying drawings wherein Figure 1 is a side view, partly in section, on the line I—I of Figure 2, showing a portion of a locomotive embodying the present invention; Fig. 2 is a fragmental end view, partly in section, on the line II—II of Fig. 1; Fig. 3 is a section on the line III—III of Fig. 2, the by-pass valve being shown in elevation; and Figs. 4 to 6 are diagrammatic views showing the valves and piston in different positions.

While the invention, broadly considered, relates to a steam engine, its principal application is in connection with a steam locomotive and therefore the following description is made with reference more particularly to a locomotive. And likewise while, within the contemplation of the invention, the valves and valve gear may be of any suitable type, however, for purposes of illustration and as a preferred embodiment the piston type of valves and the Walschaert type of gear are shown in the accompanying drawings, in which many of the parts are shown diagrammatically, the locomotive, which is of a conventional type, being indicated generally by the reference A. The locomotive comprises, considering only one side thereof and confining the description only to parts bearing on the present invention, a cylinder saddle 1, power cylinder 2, valve chest 3, main valve 4, piston 5, piston rod 6, crosshead 7, and crosshead guides 8. The valve gear and various other parts are shown in Figs. 4–6 by indicating the parts only by their center lines and the pivotal connections and shafts only by circles at their centers. The locomotive further comprises, referring particularly to Figs. 4–6, a main connecting rod 9, main crank pin 10, eccentric crank 11, eccentric crank pin 12, eccentric rod 13, a reversing shaft 14, radius bar lifting arm 15, radius bar lifting link 16, radius bar 17, reversing link 18, link block 19 and reversing link trunnions 20, all of usual design.

Referring more particularly to Fig. 1, a combination lever 21 is pivotally connected at its lower end to a link 22 which is pivotally connected to the crosshead 7. The main valve 4 is connected by valve stem 23 to a crosshead 24 which is connected by a link 25 to the combination lever 21, the crosshead 24 sliding in guides 26. The radius bar 17 is pivotally connected to the combination lever 21, above the pivotal connection of the link 25. The valve chest 3 is open to the cylinder 2 through the steam ports 27 and 28, the valve 4 being of the inside admission piston type and having a portion 29 for covering port 27 and a portion 30 for covering port 28. Between these portions the valve is spaced from its chest to provide a steam receiving chamber 31.

Disposed on the valve chest 3 is an auxiliary valve chest 32, which provides an auxiliary valve cylinder 33. A bushing 34 is disposed in the cylinder 33 and an auxiliary cut-off valve 35 of the outside admission piston type is disposed to reciprocate in the bushing. The valve cylinder 33 communicates with the valve chest 3 through openings in the bushing 34 and wall between the chests providing the steam port 36. Valve 35 is connected to a valve stem 37 which is connected to a crosshead 38 sliding in guides 39 formed on a bracket 40 carried by the rear head of the valve chest 3 on which bracket is also formed the aforesaid guides 26. The crosshead 38 is pivotally connected to the upper end of an extension of the combination lever 21 above the pivotal connection for the radius bar 17. Packing 41 around the valve stems and piston rod provides the usual steam tight joints therefor.

A main steam supply pipe 42 of usual construction has a passageway 43 leading to a chamber 44. This chamber 44 is in direct communication with the cylinder 33, both ends of which open into the chamber through openings 45.

A chamber 46 (see Fig. 2), which opens directly into the valve chest 3 through opening 47, has a transverse wall 48 and a transverse wall 49 below the wall 48. The wall 48 has an orifice 50 providing a valve seat 51 and the wall 49 has an orifice 52 providing a valve seat 53, both of said orifices affording communication between chambers 44 and 46. A by-pass valve 54 disposed in the orifices 50 and 52 has a face 55 for engaging the seat 51 and a face 56 for engaging the seat 53, thereby adapting the valve, when seated, to shut off chamber 46 from communication with chamber 44, and when open to allow steam from chamber 44 to pass through chamber 46 to valve chest 3. The by-pass valve 54 has a cup-shaped hollow 57, the bottom wall of which has orifices 58 for allowing steam to pass therethrough at all times. Guides 59 are provided on the by-pass valve 54 for guiding it in the orifices 50 and 52.

The by-pass valve 54 is connected to a stem 60 which is pivotally connected to an arm 61 secured to a shaft 62. The shaft 62 is journalled in bearings 63 and extends longitudinally of the chamber 44 and extends through a wall of the auxiliary valve chest 32 to the exterior. The outer end 64 of the shaft 62 is connected to an arm 65 similar to the arm 61 but extending in the opposite direction. This arm 65 is pivotally connected to an end of a rod 66 which is secured at its other end to a compressed air operated piston 67 sliding in a cylinder 68 formed in a housing 69. The piston 67 is forced upward by a spring 70 to automatically close by-pass valve 54 when the air pressure on the piston is released. A pipe 71 leads from a compressed air supply (not shown) to the cylinder 68 and is adapted to admit air to the cylinder 68 to operate the piston 67 to open the valve 54, a hand control (not shown) for the air supply to the pipe being located in the cab of the locomotive.

The preferred embodiment of the invention comprises a main valve of the inside admission type, an auxiliary valve of the outside admission type, a Walschaert type of valve gear modified according to the present invention, and a hand-controlled by-pass for supplying steam to the valve chest of the main valve (when it is operating as the cut-off valve) large enough to supply ample steam to the power cylinder during cut-off by the main valve so that the main valve may be employed over a range of cut-offs large enough to include operation on long, hard pulls at moderate speeds.

Various of the advantages resulting from the employment of the above features have been briefly referred to in the foregoing description. They comprise:

First, relating to the auxiliary valve and during the functioning thereof as the cut-off valve, the following six points of advantage, bearing in mind that during this functioning the auxiliary valve controls the cut-off event and the main valve controls all the other events:

(1) Ample port opening of the auxiliary valve at the point of admission by the main valve and of the main valve at cut-off by the auxiliary valve, thereby eliminating any tendency of wire-drawing the steam by these valves at these two events;

(2) A later opening of the main valve ports for admission of the steam to the cylinder;

(3) A later opening of the main valve ports for release of exhaust from the cylinder;

(4) A later closure of the main valve port (compression);

(5) For cut-offs requiring shortest travel of the valves a positioning of the link block at a sufficient distance from the trunnions so that there will be no chance, on account of distortion of the gear, or parts thereof, of the block being forced to the opposite side of the trunnions which would cause a reversal in the direction of movement of the engine (locomotive); and (6) The ability to make fine adjustments for slight variations in points of cut-off by relatively large movements of the link block.

Second, during the functioning of the main valve as the cut-off valve:

(7) Supplying a relatively large amount of steam to the valve chest of the main valve, independent of the relatively small supply from the auxiliary valve, for operating under moderate speed during long, hard pulls, the steam supply being also ample for starting.

In the present embodiment the main valve controls the direction of movement of the locomotive, the eccentric follows the crank, and the block works in the lower half of the link for forward motion of the locomotive. Therefore a valve gear constructed and connected with the valves according to the previous description will operate the outside admission auxiliary valve and the inside admission main valve in opposite cycles. Accordingly when the auxiliary valve is operating as the cut-off valve it will be moving in a port closing direction for cut-off while the main valve will be moving in a port opening direction for admission of steam to the cylinder.

While the invention is not limited to any particular range of short cut-offs for the auxiliary valve, but assuming, by way of example, a range from 10% to 25%, the block is moved toward the trunnions, but to a safe distance therefrom, which may desirably be at the point for 25% cut-off by the main valve when operating as the cut-off valve. This point is employed as the position of the block for the 25% cut-off by the auxiliary valve. This, as is well known, is a point sufficiently removed from the trunnions to prevent any likelihood of a distortion of the valve gear or any of its parts from resulting in an accidental movement of the block to the other side of the trunnions which would cause a reversal of the direction of the locomotive, and, as will later be seen, this being the nearest position to the trunnions that the block will assume during any adjustment of the block for cut-offs by either of the valves, all danger of accidental reversal of the locomotive, which was the above fifth point of advantage, is avoided.

Fig. 6 is intended to show such a position of the block. For gradually shortening the cut-off by the auxiliary valve the block is moved in the link from this 25% cut-off position toward the lower end of the link. Let it be assumed that for the 10% cut-off by the auxiliary valve the block will be in the position for say roughly 50% cut-off by the main valve, as shown in Figs. 4 and 5 of the drawings.

For cut-offs longer than 25% the by-pass is opened, as aforedescribed, to admit ample steam to the main valve steam chest, and during these longer cut-offs the main valve operates for all events, including cut-off. It will thus be seen that while operating the auxiliary valve as the cut-off valve, the shortest throw of the main valve is at longest cut-off (25%) by the auxiliary valve and that the throw of the main valve increases as the cut-off by the auxiliary valve becomes shorter.

It is a well appreciated fact that the longer the throw (the longer the cut-off) by the main valve, the later will be the admission and also that a later than usual admission is especially desirable for short cut-offs. This is not attainable where but one valve is employed for all cut-offs, for the reason that for short cut-offs there is a corresponding short throw of the valve. It is, however, attainable with the present invention where an auxiliary valve is employed for short cut-offs and where the main valve is employed for admission and the throw of the main valve increases as the cut-off of the auxiliary valve is shortened. Therefore the present exemplification of the invention illustrates an embodiment which attains the above second point of advantage, namely a later admission.

It is well appreciated that the longer the cut-off (the longer the throw by the main valve), the later the release and the later the compression, and that the retarding of these two events is especially desirable in the case of short cut-offs where the steam is used highly expansively. Obviously these highly desirable points of advantage cannot be obtained where but a single valve is used, for in such case the short cut-offs are attended by corresponding short throws of the valve. It is, however, attainable with the present invention where the auxiliary valve is employed for short cut-offs and where the main valve is employed for release and closure or compression for, with these short cut-offs by the auxiliary valve, there are accompanying relatively long throws of the main valve, increasing as the cut-offs become shorter, from throws of the main valve for a 25% cut-off setting of this valve to a 50% cut-off setting. Therefore the present exemplification of the invention illustrates an embodiment which attains the above third and fourth points of advantage, namely a retarding of the release and closure events.

It is well known that when the link block is in a location near the trunnions a relatively small adjustment of the link block will effect a relatively large change in the cut-off, and that when the link block is in a location remote from the trunnions the reverse is the fact. In former constructions the cut-off by the valve, whether main or auxiliary, is adjusted by movement of the block in a direction away from the trunnions to increase the cut-off, with the result that in the range of very short cut-offs a small adjustment of the link block will result in a relatively large change in cut-off which obviously does not permit of fine adjustment of short cut-offs.

In the present invention adjustment of the auxiliary valve, which controls all short cut-offs, is made by moving the link block in a direction away from the trunnions to shorten the cut-off, the link block operating for very short cut-offs at a distance remote from the trunnions. Therefore in adjusting the block for any of these very short cut-offs an appreciable movement of the block will be required for slight changes in the cut-off, thereby making finer adjustment for this range of cut-offs possible.

Therefore the present embodiment attains the above sixth point of advantage, namely a more accurate attainment of the said various points of short cut-off when desired.

Referring to Fig. 4, and considering only the operation of the mechanism when the auxiliary valve is functioning as the cut-off valve, here is shown the piston at the forward end of its stroke and the locomotive moving in a forward direction, as noted by the arrow. The main valve is open to the extent of the lead, with the piston about to move backward on its return stroke. The combination lever is in its usual angular crank forward dead center position which is its position with its lower end at its extreme position forward, and its upper end well to the rear thereof, providing a full open port for the auxiliary valve.

The positions of the parts as thus described are not affected by the position of the block in the link. This position of the valves provides for a large admission of steam to the steam chest of the main valve at opening of the main valve for admission, and as the travel of the auxiliary valve is long relative to the travel of the piston for the short cut-offs controlled by the auxiliary valve there will be relatively large port opening of the auxiliary valve during its movement from this position, as shown in Fig. 4, to its cut-off position, as shown in Fig. 5, thereby minimizing the amount of wire-drawing of this valve.

In former constructions of auxiliary cut-off valves and also where the main valve alone is employed shorter cut-offs are obtained by movement of the block toward the trunnions and for the short cut-offs such as those provided by the auxiliary cut-off valve, the shorter of these are accompanied by a correspondingly short movement of the main valve. Therefore at these shorter cut-offs there is considerable wire-drawing.

It will be noted that at any position of the link, while the eccentric is moving in its first quarter of travel from its upper midposition, any adjustment of the block will move the valves in the same direction, and that movements of the block away from the trunnions will effect a forward movement of the valves, and that movements of the block toward the trunnions will effect a rearward movement of the valves. This forward movement of the valves results in a wider port opening of the main valve at cut-off by the auxiliary valve as the cut-off by the auxiliary valve is shortened, and consequently as to those shorter of the short cut-offs above referred to, where the block works near the lower end of the link, there will be large port openings of the main valve, and therefore there will be no wire-drawing whatever by the main valve at these shorter cut-offs where wire-drawing is the most objectionable. Therefore the present embodiment attains the first point of advantage, namely a minimization of wire-drawing of steam during short cut-offs.

The main valve is relied upon for all cut-offs beyond the 25% cut-off which the auxiliary cut-off valve is designed to take care of. Therefore when it is desired to cut-off at any later point in the stroke of the piston than 25% thereof the by-pass from the steam supply to the main valve chest is opened to provide the required steam, for no sufficient supply of steam will be provided through the port of the auxiliary valve during these longer cut-offs by the main valve.

Now considering the main valve as the cut-off valve, the longest cut-off of this valve (say substantially 90% cut-off) is employed for starting the locomotive and for moving at relatively low speeds, such as when travelling up steep grades under heavy load. Ample steam is provided by the by-pass for such conditions. This supply of steam is also made sufficient to drive the locomotive at moderate speeds (that is to say at considerably higher speeds than the speeds just referred to) when the locomotive is travelling on long hard pulls.

In prior constructions involving auxiliary valves, reliance has been made on the steam controlled by the auxiliary valve for a substantial portion of the steam where the main valve is operating as the cut-off valve. This is because in such instances the cut-off by the auxiliary valve, and consequently the steam it supplies to the cylinder, increases with increase of the travel of the main valve, therefore the relatively small amount of added steam required when the main valve is employed as the cut-off valve in prior instances is provided from a source of supply having a restricted passage.

In the present instance, however, when the main valve is being used as the cut-off valve the cut-off of steam by the auxiliary valve is shorter as the cut-off and travel of the main valve becomes longer. Therefore as the auxiliary cut-off valve supplies less steam when steam is needed most, substantially no reliance is placed upon the auxiliary cut-off valve for supplying such steam, and consequently the by-pass is relied upon for substantially all the steam. Therefore the present embodiment attains, as a novel feature, the seventh point of advantage, namely when the main valve is used as the cut-off valve the by-pass is open and substantially all the steam for the cylinder is supplied therefrom for starting the locomotive and travelling at moderate speeds for long, hard pulls.

The closing of the auxiliary valve is effected by the additive movements of the link and crosshead imparted to the combination lever. During this closing movement of the auxiliary valve the movement imparted to the crosshead by the piston is relatively small but the movement imparted to the link by the eccentric is relatively large. The position of the auxiliary valve at dead center is the same for all cut-offs. Therefore for shortest cut-off (10%) the valve must travel at the highest speed relative to that of the piston, and to accomplish this the block, as shown in Figs. 4 and 5, is moved to a lower position in the link, the position for longest movement of the auxiliary valve by the link when the auxiliary valve is operating as the cut-off valve. For this shortest cut-off (10%) the link will travel through a relatively small angle from its position when the piston is at the beginning of its stroke (dead center) to its position at cut-off. For longer cut-offs the link will travel through greater angles. Therefore the block must be moved in its link progressively to points nearer to the trunnions to effect such longer cut-offs.

In designing the valve gear and valve construction a conventional main valve and valve gear therefor may be employed as shown in the drawings. A position of the block at a safe distance below the trunnions is determined for the longest cut-off by the auxiliary valve, and the auxiliary valve, its port and the distance of the connection of its stem with the combination lever above the point of connection with the combination lever of the radius bar are relatively proportioned to suitably provide for closure of the auxiliary port at this cut-off and also at shortest cut-off, which will be for a position of the block near the bottom of its link. Intermediate positions for the block may then be determined for intermediate cut-offs by the auxiliary valve, and the scale on the control quadrant in the cab graduated accordingly so that the engineer may adjust the block for any desired cut-off by the auxiliary valve.

In the preferred embodiment the longer cut-off, say for example 25% cut-off, is desirably determined by placing the block at the point in its link corresponding to 25% cut-off by the main valve when acting as the cut-off valve. Therefore at this point of the block both valves will be operating to close their respective ports for cut-off simultaneously, and should the engineer wish to operate at shorter cut-off he will close the by-pass and then adjust the block for such desired shorter cut-off without necessarily reducing the speed of the engine.

It has been previously stated that when the main valve is operating as the cut-off valve it is supplied with the major portion of the steam, in fact substantially all of the steam, from the by-pass. As a matter of fact, it is the operation of the control valve in the by-pass that determines whether the cut-offs will be governed by the main valve or the auxiliary valve. When the by-pass valve is opened by the engineer the cut-off of steam is automatically shifted to the main valve, and vice versa, when the by-pass valve is closed the cut-off of steam is automatically shifted to the auxiliary valve. This is for the reason that the movement of the link block sets both valves for cut-off, but, as above stated, the operation of the valve in the by-pass determines which shall act as the cut-off valve.

While the description of the operation of the valves has been made particularly with reference to the closing of the auxiliary port during the backward stroke of the piston, it will be understood that a corresponding operation will take place for closing the auxiliary port during forward movement of the piston, at which time the eccentric will be travelling in its third quarter, the various movements being thereby similar but in reverse direction. It will also be obvious that the auxiliary valve will operate in a corresponding manner to close its port when the direction of the locomotive is reversed. Also while the invention has been described in connection with the employment of steam as the motive power it will be understood that compressed air or other suitable gas or vapor may be employed and that all such substitutes for steam are considered as equivalents of steam wherever the term "steam" is employed in the claims.

While there has been hereinbefore described an approved embodiment of this invention, it will be understood that many and various changes and modifications in form, arrangement of parts and details of construction thereof may be made without departing from the spirit of the invention and that all such changes and modifications as fall within the scope of the appended claims are contemplated as a part of this invention.

The invention claimed and desired to be secured by Letters Patent is:

1. In a steam distribution valve and valve gear mechanism for a reciprocating steam engine, a main distribution valve for the power cylinder of said engine; a valve chest having a port for supplying steam to said main valve; an auxiliary valve in said chest for controlling said port; a valve gear for operating said valves, including means, operatively connected to said valves, adjustable through a range of adjustments to simultaneously adjust said valves each through a predetermined range of points of cut-off, said means being adapted to effect progressively earlier points of cut-off of one valve and to simultaneously effect progressively later points of cut-off of the other valve, said valve gear further including means for effecting said adjustments of said valve adjusting means; and controllable means for supplying steam to said main valve independently of the steam supplied thereto through said port whereby said main valve will operate as the cut-off valve during said independent supply and said auxiliary valve will operate as the cut-off valve when said independent supply is discontinued.

2. In a steam distribution valve and valve gear mechanism for a reciprocating steam engine, a main distribution valve for the power cylinder of said engine; a valve chest having a port for supplying steam to said main valve; an auxiliary valve in said chest for controlling said port; a valve gear for operating said valves, including a combination lever, operatively connected to said valves, adjustable through a range of adjustments to simultaneously adjust said valves each through a predetermined range of points of cut-off, said combination lever being adapted to effect progressively earlier points of cut-off of one valve and to simultaneously effect progressively later points of cut-off of the other valve, said valve gear further including means for effecting said adjustments of said combination lever; and controllable means for supplying steam to said main valve independently of the steam supplied thereto through said port whereby said main valve will operate as the cut-off valve during said independent supply and said auxiliary valve will operate as the cut-off valve when said independent supply is discontinued.

3. In a steam distribution valve and valve gear mechanism for a reciprocating steam engine, a main distribution valve for the power cylinder of said engine; a valve chest having a port for supplying steam to said main valve; an auxiliary valve in said chest for controlling said port; a valve gear for operating said valves, including a combination lever, operatively connected at a point thereon with said main valve and at another point thereon with said auxiliary valve, adjustable through a range of adjustments to simultaneously adjust said valves each through a predetermined range of points of cut-off, said combination lever being adapted to effect progressively earlier points of cut-off of one valve and to simultaneously effect progressively later points of cut-off of the other valve, said valve gear further including means for effecting said adjustments of said combination lever, including a rod adapted to actuate said lever and connected thereto at a point thereon between and spaced from its other said two points; and controllable means for supplying steam to said main valve independently of the steam supplied thereto through said port whereby said main valve will operate as the cut-off valve during said independent supply and said auxiliary valve will operate as the cut-off valve when said independent supply is discontinued.

4. In a steam distribution valve and valve gear mechanism for a reciprocating steam engine, a main distribution valve for the power cylinder of said engine; a valve chest having a port for supplying steam to said main valve; an auxiliary valve in said chest for controlling said port; a valve gear for operating said valves, including a combination lever, operatively connected at a point thereon with said main valve and at another point thereon above said first point with said auxiliary valve, adjustable through a range of adjustments to simultaneously adjust said valves each through a predetermined range of points of cut-off, said combination lever being adapted to effect progressively earlier points of cut-off of one valve and to simultaneously effect progressively later points of cut-off or the other valve, said valve gear further including means for effecting said adjustments of said combination lever, including a rod adapted to actuate said lever and connected thereto at a point thereon between and spaced from its other said two points; and controllable means for supplying steam to said main valve independently of the steam supplied thereto through said port whereby said main valve will operate as the cut-off valve during said independent supply and said auxiliary valve will operate as the cut-off valve when said independent supply is discontinued.

5. In combination with a locomotive having a wheeled driving axle, a reciprocating steam engine comprising a power cylinder; a piston therefor; means operatively connecting said piston with said axle; a main valve chest having a port for supplying steam to said cylinder; a main distribution valve in said chest for controlling said port; an auxiliary valve chest having a port for supplying steam to said main valve chest; an auxiliary valve in said auxiliary valve chest for controlling its said port; a valve gear for operating said valves, including a combination lever operatively connected at a point thereon with said main valve and at another point thereon above said first point with said auxiliary valve and operatively connected at still another point on the lower portion thereof with said connecting means, said lever being adjustable through a range of adjustments to simultaneously adjust said valves each through a predetermined range of points of cut-off, said combination lever being adapted to effect progressively earlier points of cut-off of one valve and to simultaneously effect progressively later points of cut-off of the other valve, said valve gear further including means for effecting said adjustments of said combination lever comprising adjustable means, a rod operably connecting said adjustable means with said axle, and a rod operatively connecting said combination lever with said adjustable means, said last mentioned rod being connected to said combination lever at a point thereon between and spaced from said first two mentioned points thereon, said combination lever being thereby adapted to move said valves in the same direction during its said adjustment, said valves and said ports being adapted for the closing of said auxiliary port by said auxiliary valve and the opening of said main port by said main valve during said movement; and controllable means for supplying steam to said main valve independently of the steam supplied thereto through said auxiliary valve port whereby said main valve will operate as the cut-off valve during said independent supply and said auxiliary valve will operate as the cut-off valve when said independent supply is discontinued.

ROGER W. CLIFFORD.